US009466832B2

United States Patent
Nagai

(10) Patent No.: US 9,466,832 B2
(45) Date of Patent: *Oct. 11, 2016

(54) LITHIUM SECONDARY BATTERY INCLUDING A NICKEL CONTAINING LITHIUM COMPLEX OXIDE

(75) Inventor: Hiroki Nagai, Nagoya (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/060,305

(22) PCT Filed: Jun. 21, 2010

(86) PCT No.: PCT/JP2010/060490
§ 371 (c)(1),
(2), (4) Date: Feb. 23, 2011

(87) PCT Pub. No.: WO2011/161755
PCT Pub. Date: Dec. 29, 2011

(65) Prior Publication Data
US 2013/0101900 A1    Apr. 25, 2013

(51) Int. Cl.
*H01M 4/485* (2010.01)
*H01M 4/525* (2010.01)
*H01M 10/0525* (2010.01)

(52) U.S. Cl.
CPC .............. *H01M 4/485* (2013.01); *H01M 4/525* (2013.01); *H01M 10/0525* (2013.01); *Y02E 60/122* (2013.01); *Y02T 10/7011* (2013.01)

(58) Field of Classification Search
CPC ..... H01M 4/505; H01M 4/525; H01M 4/485
USPC .......................................................... 429/223
See application file for complete search history.

(56) References Cited

U.S. PATENT DOCUMENTS

| 6,872,491 | B2 * | 3/2005 | Kanai et al. .................. 429/223 |
| 2002/0001751 | A1 * | 1/2002 | Doddapaneni et al. ... 429/231.5 |
| 2003/0206852 | A1 * | 11/2003 | Yang et al. ................. 423/594.4 |
| 2007/0212607 | A1 | 9/2007 | Fujihara et al. |
| 2007/0218370 | A1 | 9/2007 | Deguchi et al. |
| 2009/0035659 | A1 * | 2/2009 | Takeuchi et al. ............. 429/223 |
| 2009/0155691 | A1 * | 6/2009 | Park et al. .................... 429/223 |

(Continued)

FOREIGN PATENT DOCUMENTS

| CN | 1943072 | 4/2007 |
| CN | 101305484 | 11/2008 |

(Continued)

OTHER PUBLICATIONS

Machine translation of JP 2008-243448, obtained Mar. 3, 2015.*

(Continued)

*Primary Examiner* — Nicholas P D'Aniello
(74) *Attorney, Agent, or Firm* — Finnegan, Henderson, Farabow, Garrett & Dunner, LLP

(57) ABSTRACT

Provided is a lithium secondary battery that comprises a positive electrode having a positive electrode active material, a negative electrode having a negative electrode active material, and a non-aqueous electrolyte. The positive electrode active material is a nickel-containing lithium complex oxide having a layered structure. The oxide has a composition in which W and Zr are added, and contains no Nb.

21 Claims, 6 Drawing Sheets

(56) References Cited

U.S. PATENT DOCUMENTS

| | | |
|---|---|---|
| 2009/0233176 A1 | 9/2009 | Kita et al. |
| 2010/0143802 A1* | 6/2010 | Takei .......................... 429/223 |
| 2012/0270107 A1 | 10/2012 | Toya et al. |
| 2013/0089787 A1 | 4/2013 | Nagai |

FOREIGN PATENT DOCUMENTS

| | | |
|---|---|---|
| CN | 101662025 | 3/2010 |
| JP | 2003068306 A * | 3/2003 |
| JP | 2007-273448 | 10/2007 |
| JP | 2007-299668 | 11/2007 |
| JP | 2008-53054 | 3/2008 |
| JP | 2008243448 A * | 10/2008 |
| JP | 2008-270086 | 11/2008 |
| JP | 2009-140787 | 6/2009 |
| JP | 2011-116580 | 6/2011 |

OTHER PUBLICATIONS

Machine translation of JP 2003-068306, obtained Mar. 3, 2015.*
Final Office Action issued in U.S. Appl. No. 13/805,004 dated Jan. 22, 2016.
Office Action maiied Jul. 7, 2015 in U.S. Appl. No. 13/805,004.
Office Action mailed Aug. 29, 2014 in U.S. Appl. No. 13/805,004.
Office Action mailed May 1, 2014 in U.S. Appl. No. 13/805,004.
Election/Restriction mailed Feb. 28, 2014 in U.S. Appl. No. 13/805,004.

* cited by examiner

US 9,466,832 B2

LITHIUM SECONDARY BATTERY INCLUDING A NICKEL CONTAINING LITHIUM COMPLEX OXIDE

CROSS-REFERENCE TO RELATED APPLICATION

This application is a national phase application of International Application No. PCT/JP2010/060490, filed Jun. 21, 2010, the contents of which are incorporated herein by reference.

TECHNICAL FIELD

The present invention relates to a lithium secondary battery, and more particularly, to a lithium secondary battery that comprises, as a positive electrode active material, a nickel-containing lithium complex oxide.

BACKGROUND ART

Recent years have witnessed a growing importance of lithium secondary batteries as power sources installed in vehicles, and as power sources in personal computers, cell phones and the like. Lithium ion secondary batteries, in particular, are lightweight and afford high energy densities, and are thus expected to become preferred high-output power sources installed in vehicles. Typical examples of positive electrode active materials used in lithium secondary batteries include complex oxides that comprise lithium and a transition metal element. For instance, there is preferably used a complex oxide in the form of a lithium complex oxide that contains at least nickel (Ni) as the transition metal element (nickel-containing lithium complex oxide), and that has a layered structure. Prior art documents relating to lithium secondary batteries include Patent documents 1 to 4 below.

Patent document 1: Japanese Patent Application Publication No. 2009-140787
Patent document 2: Japanese Patent Application Publication No. 2008-53054
Patent document 3: Japanese Patent Application Publication No. 2007-299668
Patent document 4: Japanese Patent Application Publication No. 2007-273448

DISCLOSURE OF THE INVENTION

In batteries from which high output is required, such as batteries installed in vehicles, it is important that the internal resistance of the battery be kept low. For instance, a battery having yet lower internal resistance and better output performance could be achieved if it were possible to reduce the reactive resistance (in particular, reactive resistance at the positive electrode) in the battery. Patent document 1 discloses the feature of providing a battery having excellent output characteristics and little gas generation, by using, as a positive electrode active material used in a non-aqueous electrolyte secondary battery, a lithium-nickel-cobalt-manganese complex oxide that contains, as essential components, tungsten (W) and niobium (Nb). Patent document 1 discloses also a positive electrode active material containing zirconium (Zr) as well, besides W and Nb. The inventors have studied extensively the characteristics of positive electrode active materials in which two components, W and Nb, are added to a lithium-nickel-cobalt-manganese complex oxide, and of positive electrode active materials in which three components, W, Nb and Zr are added thereto. As a result, the inventors have found that a positive electrode active material containing W and Nb as essential components has poor durability (impaired characteristics, for instance increases in reactive resistance and/or drops in capacity after multiple charges and discharges).

It is thus an object of the present invention to provide a lithium secondary battery that uses a nickel-containing lithium complex oxide having a layered structure as a positive electrode active material, such that the battery has excellent initial characteristics (for instance, having low internal resistance and being suited for higher outputs), and excellent durability.

The lithium secondary battery provided by the present invention comprises a positive electrode having a positive electrode active material, a negative electrode having a negative electrode active material, and a non-aqueous electrolyte. The positive electrode active material is a nickel-containing lithium complex oxide having a layered structure, has a composition in which W and Zr are added, and contains no Nb. The initial characteristics of the battery can be enhanced in a lithium secondary battery having such a configuration thanks to the combined addition of W and Zr. For instance, there is elicited an effect of significantly reducing initial internal resistance (for instance, initial reactive resistance at normal temperature and low temperature). Such a lithium secondary battery is preferred in that the lithium secondary battery exhibits better output performance (for instance, higher output). Since the use of Nb is excluded in order to elicit the above effects, high durability can be achieved together with the above-described initial characteristic enhancement effect. That is, excellent initial characteristics can be brought out over long periods of time.

As used in the present description, the term "lithium secondary battery" denotes a secondary battery in which lithium ions are used as electrolyte ions, and charge and discharge are realized through transfer of charge by way of lithium ions between a positive and a negative electrode. In the present description, lithium secondary batteries include, as typical examples thereof, batteries ordinarily called lithium ion secondary batteries.

In the present description, the nickel-containing lithium complex oxide "containing no Nb" means that the oxide is at least a nickel-containing lithium complex oxide into which Nb is not deliberately incorporated. Typically, this means that the presence of Nb is not detected (at or below the detection limit) in at least analysis by ICP spectroscopy.

Preferably, an addition amount of W and an addition amount of Zr in the nickel-containing lithium complex oxide are such that a proportion of the number of moles of W in the total number of moles of W and Zr ranges from 30% to less than 100%. Such an addition amount ratio allows realizing a battery having higher initial characteristics (for instance, lower initial internal resistance).

Suitable examples of the nickel-containing lithium complex oxide include a lithium complex oxide (hereafter, also "LiNiCoMn oxide") that contains nickel, cobalt (Co) and manganese (Mn). Such a positive electrode active material allows realizing a lithium secondary battery having, in particular, low internal resistance (for instance, initial reactive resistance).

The present invention provides also a vehicle comprising any of the lithium secondary batteries disclosed herein. The lithium secondary battery has reduced internal resistance (reactive resistance) and has excellent durability against multiple charges and discharges. Therefore, the lithium secondary battery can deliver high performance (for instance high output) over long periods of time, which makes the lithium secondary battery suitable as a battery installed in vehicles. Therefore, the battery can be suitably used as a power supply for a motor (electric motor) that is installed in a vehicle, for instance an automobile.

DESCRIPTION OF EMBODIMENTS

Figure 1:
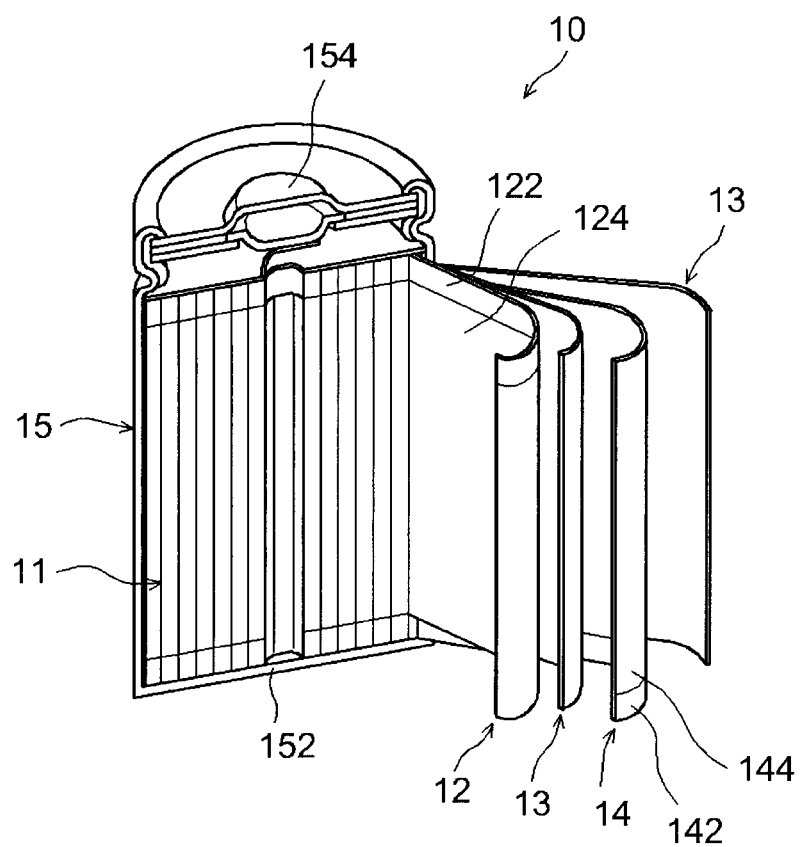
FIG. 1 is a partial cross-sectional diagram illustrating schematically the configuration of a cylindrical lithium secondary battery according to an embodiment.

Preferred embodiments of the present invention are explained below. Any features other than the features specifically set forth in the present description and which may be necessary for carrying out the present invention can be regarded as design matter for a person skilled in the art on the basis of known techniques in the technical field in question. The present invention can be carried out on the basis of the disclosure of the present description and common technical knowledge in the technical field in question.

The positive electrode active material in the technology disclosed herein is a nickel-containing lithium complex oxide having a layered structure and having a composition that comprises W and Zr, but no Nb. In addition to Li, Ni and W and Zr, the positive electrode active material can comprise one, or two or more other metal elements (excluding Nb). Examples of such metal elements include, for instance, one, two or more elements selected from among, for instance, Co, Mn, Al, Cr, Fe, V, Mg, Ti, Mo, Cu, Zn, Ga, In, Sn, La, Ce, Ca and Na. The technology disclosed herein can be used in positive electrodes for lithium secondary batteries that are provided with such a positive electrode active material, and in various types of lithium secondary batteries (typically, lithium ion secondary batteries) having that positive electrode as a constituent element.

The positive electrode active material may be a lithium complex oxide having a composition (containing no Nb) wherein at least W and Zr are added to a layered nickel-containing lithium complex oxide represented by Formula (I)

$$Li_{1+m}Ni_pCo_qMn_rM^1_sO_2 \qquad (I).$$

The $M^1$ in Formula (I) may be one, two or more selected from among Al, Cr, Fe, V, Mg, Ti, Mo, Cu, Zn, Ga, In, Sn, La, Ce, Ca and Na. Also, m, p, q, r and s may be numerals that satisfy $0 \leq m \leq 0.2$, $0 \leq p \leq 0.6$ (typically, $0.1 \leq p \leq 0.6$) $0 \leq q \leq 0.5$, $0 \leq r \leq 0.5$, $0 \leq s \leq 0.02$, p+q+r+s=1. In a preferred embodiment, $0 \leq s < p$, and s is substantially 0 (i.e., the oxide comprises substantially no $M^1$). The above Formula (I) denotes the composition upon battery construction (i.e. the composition of the positive electrode active material used to produce the battery). This composition may ordinarily be about the same as the composition at a time where the battery is fully discharged. A positive electrode active material having such a composition allows realizing a lithium secondary battery of low internal resistance (for instance, initial reactive resistance) and excellent in durability.

Suitable examples of the nickel-containing lithium complex oxide disclosed herein include, for instance, an oxide comprising at least Co and Mn (specifically, a LiNiCoMn oxide). For instance, the oxide is preferably a LiNiCoMn oxide of Formula (I) where $0 < q \leq 0.5$ and $0 < r \leq 0.5$. The first element (most abundant element on number of atoms basis) among Ni, Co and Mn may be any from among Ni, Co and Mn. In a preferred embodiment, the first element is Ni. In another preferred embodiment, the Ni, Co and Mn contents are approximately identical, on a number of atoms basis.

The composition of the lithium complex oxide wherein a lithium complex oxide represented by Formula (I) has W and Zr added thereinto is represented typically by Formula (II) below:

$$Li_{1+m}Ni_pCo_qMn_rM^1_sW_\alpha Zr_\beta O_2 \qquad (II).$$

In Formula (II) above, $\alpha > 0$, $\beta > 0$, and m, p, q, r and s have the same meaning as in Formula The addition amount of W can be, for instance, no greater than 5 mol % (i.e. $0 < (\alpha/T) \leq 0.05$) with respect to the total metal amount T, excluding Li (p+q+r+s+$\alpha$+$\beta$ in the oxide represented by Formula (II)) comprised in the nickel-containing lithium complex oxide. Ordinarily, a suitable addition amount of W is no greater than 3 mol % ($0 < (\alpha/T) \leq 0.03$), preferably no greater than 2 mol % ($0 < (\alpha/T) \leq 0.02$). In a preferred embodiment, the addition amount of W ranges from 0.01 mol % to 3 mol % (for instance, from 0.02 mol % to 2 mol %). An excessively small amount of W may prevent eliciting a sufficient effect of enhancing battery performance (for instance, effect of reducing initial reactive resistance) vis-à-vis a positive electrode active material having a composition containing no W. An excessively large amount of W may make it harder to elicit a sufficient battery performance enhancement effect vis-à-vis a composition containing no W, or may impair battery performance.

The addition amount of Zr in the positive electrode active material disclosed herein can be, for instance, no greater than 5 mol % (i.e. $0 < (\beta/T) \leq 0.05$) with respect to the total metal amount T, other than Li, in the nickel-containing lithium complex oxide. Ordinarily, a suitable addition amount of Zr is no greater than 3 mol % $0 < (\beta/T) \leq 0.03$), preferably no greater than 2 mol % ($0 < (\beta/T) \leq 0.02$), and more preferably no greater than 1 mol % ($0 < (\beta/T) \leq 0.01$). In a preferred embodiment, the addition amount of Zr ranges from 0.01 mol % to 2 mol % (for instance, from 0.02 mol % to 1 mol %). An excessively small amount of Zr may prevent eliciting a sufficient effect of enhancing battery performance (for instance, effect of enhancing durability) vis-à-vis a positive electrode active material having a composition containing no Zr. An excessively large amount of Zr may make it harder to elicit a sufficient battery performance enhancement effect vis-à-vis a composition containing no Zr, or may impair battery performance.

The total addition amount of W and Zr may be, for instance, not smaller than 0.02 mol % (i.e. $(\alpha+\beta)/T \geq 0.0002$)

with respect to the total metal amount T, other than Li, comprised in the nickel-containing lithium complex oxide. Ordinarily, a suitable total addition amount is not smaller than 0.05 mol %, preferably not smaller than 0.5 mol %, more preferably not smaller than 1.0 mol %. The upper limit of the total addition amount of W and Zr can be set to be, for instance, no greater than 10 mol %. An appropriate upper limit is ordinarily no greater than 5 mol %, preferably no greater than 2 mol %. If the total addition amount is too small, the battery performance enhancing effect (for instance, durability enhancing effect) that is brought about through the addition of these elements may fail to be sufficiently elicited. An excessively large total addition amount may curtail the enhancing effect on battery performance.

The addition amount ratio (molar ratio) between W and Zr is not particularly limited. For instance, the proportion of the number of moles of W in the total number of moles of W and Zr (i.e. the W/(W+Zr) molar ratio) can range from 5% to less than 100%. Ordinarily, a proportion ranging from 15% to less than 100% is appropriate. In a preferred embodiment, the proportion of the number of moles of W in the total number of moles of W and Zr ranges from 30% to less than 100% (for instance, from 50% to less than 100%). The above addition amount ratio allows further reducing initial reactive resistance (in particular initial reactive resistance at low temperature (for instance, −30° C.)).

The positive electrode active material disclosed herein may be a nickel-containing lithium complex oxide (for instance a LiNiCoMn oxide) that further comprises elements, besides W and Zr, that can be useful in enhancing the effect of the present invention. For instance, the type and content of such elements (characteristic-enhancing elements) may be set in such a manner that charge-discharge cycle characteristics are enhanced vis-à-vis a case where such elements are absent or the content thereof is smaller (for instance, enhancing of at least one, preferably both, from among reactive resistance increase rate and capacity retention, at 25° C. or −30° C., after 1000 cycles or 2000 cycles). Appropriate examples of elements that can elicit such effects include, for instance, alkali metals (Na, K or the like) and alkaline earth metals (Mg, Ca and the like). The elements can be incorporated singly or in appropriate combinations of two or more elements. Appropriate contents of the elements are, for instance, no more than 1000 ppm (ordinarily, no more than 500 ppm, typically from 10 ppm to 500 ppm, for instance 300 ppm to 500 ppm) for Na; no more than 1500 ppm (ordinarily, no more than 1000 ppm, typically from 10 ppm to 1000 ppm, for instance 50 ppm to 1000 ppm) for Ca, no more than 1500 ppm (ordinarily, no more than 1000 ppm, typically from 10 ppm to 1000 ppm, for instance 100 ppm to 1000 ppm) for Mg.

The origin of the above-mentioned characteristic-enhancing element comprised in the positive electrode active material is not particularly limited. For instance, the element may be an impurity in a starting material for the production of the positive electrode active material, and/or an impurity that may be taken up during the production process of the positive electrode active material (for instance, a component derived from a reaction solution that is used for preparing a hydroxide in a below-described co-precipitation method, or a component derived from a sheath (also called a sagger) used for firing the hydroxide), and that becomes comprised eventually in the positive electrode active material. Alternatively, the positive electrode active material may be produced by deliberately blending therein a material that can constitute a source of the characteristic-enhancing element.

So long as the effect of the present invention is not significantly compromised thereby, the positive electrode active material disclosed herein may be a nickel-containing lithium complex oxide (for instance, a LiNiCoMn oxide) that further comprises another element (excluding Nb), besides W and Zr. The above-mentioned other element may be one, two or more from among, for instance, Co, Mn, Al, Cr, Fe, V, Mg, Ti, Mo, Ta, Cu, Zn, Ga, In, Sn, La, Ce, Ca and Na.

In a suitable example of the technology disclosed herein, the positive electrode active material is a nickel-containing lithium complex oxide substantially containing no metal element other than Li, Ni, Co, Mn, W, Zr, alkali metals (excluding Li) and alkaline earth metals. However, metal elements other than the above-described ones are permitted to be unintentionally or unavoidably comprised in the positive electrode active material. The upper limit for the allowable content of such impurities is not particularly limited, and may be an upper limit such that the effect of the present invention is not significantly compromised thereby. Appropriate such upper limits include, for instance, no more than 10 ppm for Fe, no more than 10 ppm for Cr, no more than 50 ppm for Al, and no more than 10 ppm for Cu.

The positive electrode active material (typically, in particulate form) of the technology disclosed herein can be produced in accordance with various methods. In an explanation of an example corresponding to an instance where the nickel-containing lithium complex oxide is a LiNiCoMn oxide such that $0<p$, $0<q$, $0<r$ and $s=0$ in Formula (I) above, there may be prepared, for instance a hydroxide containing Ni, Co and Mn in intended molar ratios (typically, a NiCoMn complex hydroxide represented by $Ni_pCo_qMn_r(OH)_2$), whereupon the hydroxide is mixed with a Li source, a W source and a Zr source, in such a manner that the molar ratios of the metal atoms take on target values, and the resulting mixture is fired, to yield thereby a positive electrode active material (for instance, a lithium complex oxide represented by Formula (II)) having a composition wherein W and Zr are added to $Li_{1+m}Ni_pCo_qMn_rM^1_sO_2$. More preferably, the above-described NiCoMn complex hydroxide can be prepared, for instance, by co-precipitation. Firing is typically carried out in an oxidative atmosphere (for instance, air atmosphere). Preferably, the firing temperature ranges from 700° C. to 1050° C.

As the Li source, the W source and Zr element source there may be used an oxide that comprises the relevant metal element, or a compound capable of yielding, through heating, such an oxide (for instance, a carbonate, nitrate, sulfate, oxalate, hydroxide, ammonium salt or sodium salt of the relevant metal element). A compound comprising a plurality of types of such metal elements may also be used. As the Li source there can be used, for instance, a Li compound such as lithium carbonate or lithium hydroxide. As the W source there can be used a W compound such as a W oxide (for instance, $WO_3$), ammonium tungstate or sodium tungstate. As the Zr source there can be used a Zr compound such as a Zr oxide (for instance, $ZrO_2$), a Zr hydroxide (for instance, $Zr(OH)_4$) or zirconium sulfate ($Zr(SO_4)_2$).

Another method for producing the positive electrode active material may involve preparing an oxide (typically, a NiCoMn complex oxide represented by $Ni_pCo_qMn_rO_2$) that comprises Ni, Co and Mn in the intended molar ratios, and mixing the oxide with a Li source, a W source and a Zr element source, in such a manner that the molar ratios of the metal atoms take on target values, followed by firing of the resulting mixture.

The above-described positive electrode active material is preferably in the form of secondary particles into which primary particles are aggregated. As the positive electrode active material of the technology disclosed herein there can preferably be used, for instance, a nickel-containing lithium complex oxide powder substantially made up of secondary particles the average particle size of which ranges from about 1 μm to 25 μm (typically from about 2 pm to 15 μm). The average particle size of the primary particles ranges preferably from about 0.01 μm to 2 μm (typically, from about 0.1 μm to 1 μm).

As a characterizing feature of the technology disclosed herein, a layered nickel-containing lithium complex oxide containing W and Zr but no Nb is used as a positive electrode active material. Therefore, the material, shape and so forth of other battery constituent elements is not particularly limited so long as the object of the present invention can be achieved, and there may be used other constituent elements identical to those employed in conventional lithium secondary batteries (typically, lithium ion secondary batteries). Examples of preferred usage embodiments of the above-described positive electrode active material include, for instance, a positive electrode wherein a positive electrode mix having the above-described positive electrode active material as a main component (i.e. component that takes up 50 wt % or more, typically 75 wt % or more) is supported on a collector, as well as a lithium secondary battery provided with such a positive electrode.

As the constituent material of the collector (positive electrode collector) there can be preferably used a conductive metal material, for instance aluminum, as in conventional ordinary lithium secondary batteries. The shape of the positive electrode collector is not particularly limited, and it may vary in accordance with the shape of the battery that is built using the positive electrode. The shape of the positive electrode collector may be, for instance, rod-like, plate-like, sheet-like or mesh-like. The technology disclosed herein can be used, preferably, in a positive electrode for lithium secondary batteries having a configuration where a positive electrode mix layer is provided on a sheet-like or foil-like collector, and in lithium secondary batteries having that positive electrode as a constituent element. A preferred embodiment of such a lithium secondary battery is a battery having a configuration wherein an electrode assembly (wound electrode assembly) resulting from winding a sheet-like positive electrode and a sheet-like negative electrode, together with a sheet-like separator, is housed, together with a appropriate non-aqueous electrolyte (typically, a liquid electrolyte, i.e. an electrolyte solution), in an outer case. The outer shape of the battery is not particularly limited, and may be a rectangular parallelepiped shape, a flat shape, a cylindrical shape or the like.

In addition to the positive electrode active material (typically, in the form of particles), the positive electrode mix may contain, as the case may require, other arbitrary components, for instance a conductive material and a binder. As the conductive material there may be used, for instance, a conductive material identical to those employed in positive electrodes of ordinary lithium secondary batteries. Examples of such a conductive material include, for instance, carbon materials such as carbon powder and carbon fibers, and conductive metal powders such as nickel powder. A single material selected from among the foregoing may be used alone; alternatively, two or more such materials may be used concomitantly. Examples of carbon powders include, for instance, various types of carbon black (such as acetylene black, furnace black and Ketjen black), graphite powder and the like. Acetylene black and/or furnace black are preferably used among the foregoing.

The proportion of positive electrode active material in the total positive electrode mix is preferably not lower than about 50 wt % (typically, from 50 to 95 wt %), more preferably, ordinarily, from about 70 to 95 wt % (for instance, from 75 to 90 wt %). The proportion of conductive material in the total positive electrode mix may range, for instance, from about 2 to 20 wt %, and preferably, ranges ordinarily from about 2 to 15 wt %. In a composition that uses a binder, the proportion of binder in the total positive electrode mix can range from, for instance, about 1 to 10 wt %, and preferably, ranges ordinarily from about 2 to 5 wt %.

The operation of forming the positive electrode mix layer on the positive electrode collector may involve, for example, providing (for instance, procuring or preparing) a positive electrode mix composition in a form such that the above-described positive electrode active material is dispersed in an appropriate solvent together with other arbitrary components (conductive material, binder and so forth); and applying (typically, coating) the composition (typically, a paste-like or slurry-like composition) onto the surface of a collector, followed by drying. The solvent used may be an aqueous solvent or a non-aqueous solvent. Suitable examples of non-aqueous solvents include, for instance, N-methyl-2-pyrrolidone (NMP).

As the binder there can be appropriately used a binder identical to those used in positive electrodes of ordinary lithium secondary batteries. Preferably, there is selected a polymer that is soluble or dispersible in the solvent that is used. In a positive electrode mix composition that uses a aqueous solvent there may be preferably used, for instance, a water-soluble or water-dispersible polymer such as a cellulose polymer, for instance carboxymethyl cellulose (CMC) or hydroxypropylmethyl cellulose (HPMC); polyvinyl alcohol (PVA); a fluororesin such as polytetrafluoroethylene (PTFE) or a tetrafluoroethylene hexafluoropropylene copolymer (FEP); a vinyl acetate copolymer; or a rubber such as styrene-butadiene rubber (SBR), an acrylic acid-modified SBR resin (SBR latex) or the like. In a positive electrode mix composition that uses a non-aqueous solvent, there may be preferably used a polymer such as polyvinylidene fluoride (PVDF) or polyvinylidene chloride (PVDC). In addition to the function of binder, the above-mentioned polymer materials may be used for the purpose of bringing about the function of a thickener and/or of other additives of the above-described composition.

The operation for applying the positive electrode mix composition to the sheet-like collector may be suitably carried out using appropriate known coating equipment, for instance, (slit coaters, die coaters, comma coaters or gravure coaters). An appropriate amount of positive electrode mix composition is coated, over a predetermined area, on at least one face (typically, both faces) of the collector, followed by drying. Thereafter, the whole is pressed, as the case may require, in the thickness direction, to yield a sheet-like positive electrode (positive electrode sheet) having the intended properties. Conventional roll pressing or plate pressing may be appropriately used as the method for carrying out the above pressing.

An explanation follows next, with reference to accompanying drawings, on various embodiments of a lithium ion secondary battery provided with a positive electrode having the above features.

First Embodiment

FIG. 1 illustrates the schematic configuration of a lithium ion secondary battery according to the present embodiment.

A lithium ion secondary battery 10 has a configuration wherein an electrode assembly 11 that comprises a positive electrode 12 and a negative electrode 14 is housed within a battery case 15, which has a shape capable of accommodating the electrode assembly, together with a non-aqueous electrolyte solution, not shown. The battery case 15 comprises a bottomed tubular-shaped case main body 152, and a cap 154 that plugs the opening of case main body 152. The cap 154 and the case main body 152 are both made up of a metal, are insulated from each other, and are electrically connected to respective collectors 122, 142 of the positive and negative electrodes. That is, the cap 154 in the lithium ion secondary battery 10 doubles as a positive electrode terminal, and the case main body 152 doubles as a negative electrode terminal.

The electrode assembly 11 is formed by winding a positive electrode (positive electrode sheet) 12, wherein a positive electrode mix layer 124 comprising any of the positive electrode active materials disclosed herein is provided on a elongate sheet-like positive electrode collector 122, and a negative electrode (negative electrode sheet) 14, having a negative electrode mix layer 144 on a elongate sheet-like negative electrode collector (for instance, copper foil) 142, together with two elongate sheet-like separators 13.

As the negative electrode active material that makes up the negative electrode mix layer 144 there can be used, although not particularly limited thereto, one, two or more types of materials used in conventional lithium ion secondary batteries. Suitable examples thereof include, for instance, a particulate carbonaceous material (carbon particles) having at least partially a graphite structure (lamellar structure). Preferred carbon materials may be any from among so-called graphitic substances (graphite), hardly graphitizable carbonaceous substances (hard carbon), easily graphitizable carbonaceous substances (soft carbon), and carbon materials having a structure that combines the foregoing. Preferably, there may be used, for instance, graphite particles of natural graphite or the like.

The negative electrode mix layer 144 can be formed at a desired site of the collector 142 by coating the negative electrode collector 142 with a negative electrode mix composition that is obtained by mixing a negative electrode active material, such as the above-described one, with, for instance, typically a binder (herein there can be used, for instance, the same binder as in the mix layer on the positive electrode side) and, as the case may require, a conductive material (herein there can be used, for instance, the same conductive material as in the mix layer on the positive electrode side), followed by drying. Although, not particularly limited thereto, the proportion of negative electrode active material in the total negative electrode mix may be, for instance, of about 80 wt % or higher, (for instance from 80 to 99 wt %), and is preferably about 90 wt % or higher (for instance, from 90 to 99 wt %, more preferably from 95 to 99 wt %). In a composition that uses a binder, the proportion of binder in the total negative electrode mix can range from, for instance, about 0.5 to 10 wt %. Preferably, the proportion ranges ordinarily from about 1 to 5 wt %.

As the separators 13 that are used when combining the positive and negative electrode sheets 12, 14 there can be employed the same material as in conventional lithium ion secondary batteries. Preferably, there can be used, for instance, a porous resin sheet (film) comprising a polyolefin resin such as polyethylene or polypropylene.

A portion where the positive electrode mix layer is not provided and the collector 122 is exposed (positive electrode mix layer non-formation portion) is provided along one edge of the positive electrode collector 122 in the longitudinal direction. A portion where the negative electrode mix layer is not provided and the collector 142 is exposed (negative electrode mix layer non-formation portion) is provided along one edge of the negative electrode collector 142 in the longitudinal direction. As illustrated in FIG. 1, the positive and negative electrode sheets 12, 14 are superposed slightly offset from each other in the width direction, in such a manner that the two mix layers 142, 144 are superposed and the mix layer non-formation portions of the two electrode sheets jut out beyond one end and the other end, respectively, of the separator 13, in the longitudinal direction. These jutting portions are connected to the cap 154 and the case main body 152, respectively.

The electrolyte solution is not particularly limited, and may be identical to non-aqueous electrolyte solutions that are conventionally used in lithium ion secondary batteries. Such non-aqueous electrolyte solutions typically have a composition wherein an appropriate non-aqueous solvent contains a supporting salt. As the above-described non-aqueous solvent there can be used, for instance, one, two or more solvents selected from the group consisting of ethylene carbonate (EC), propylene carbonate (PC), dimethyl carbonate (DMC), diethyl carbonate (DEC), ethyl methyl carbonate (EMC), 1,2-dimethoxyethane, 1,2-diethyoxyethane, tetrahydrofuran, 1,3-dioxolane and the like. As the supporting salt (supporting electrolyte) there can be used, for instance, a lithium salt such as $LiPF_6$, $LiBF_4$, $LiAsF_6$, $LiCF_3SO_3$, $LiC_4F_9SO_3$, $LiN(CF_3SO_2)_2$ or $LiC(CF_3SO_2)_3$.

Second Embodiment

Figure 2:
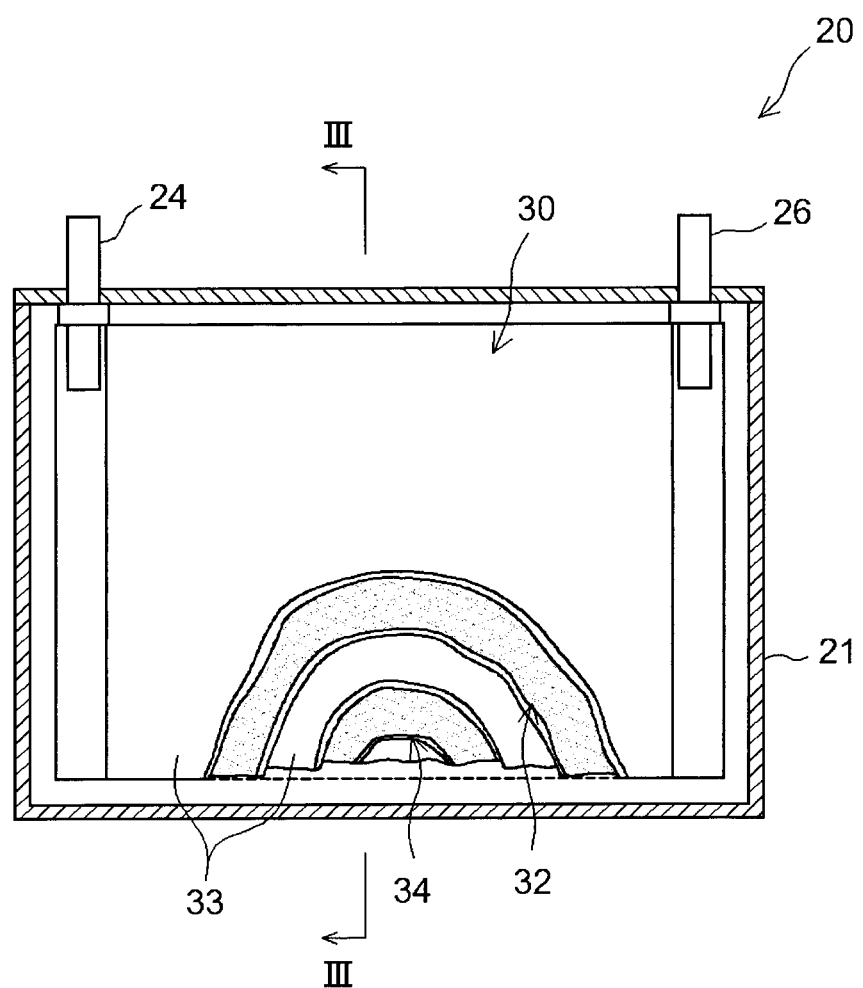
FIG. 2 is a partial cross-sectional diagram illustrating schematically the configuration of a square lithium secondary battery according to an embodiment.
Figure 3:
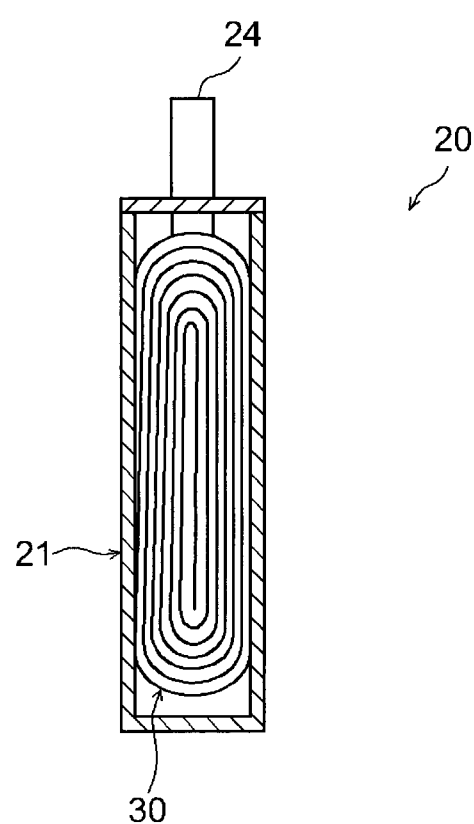
FIG. 3 is a cross-sectional diagram of FIG. 2 along line III-III.

FIG. 2 and FIG. 3 illustrate the schematic configuration of a lithium ion secondary battery according to the present embodiment. A lithium ion secondary battery 20 comprises a flat box-like collector 21 (typically, made of metal, but also made of resin in some instances). A wound electrode assembly 30 is accommodated in the container 21. The electrode assembly 30 of the present embodiment is formed by stacking and winding a positive electrode sheet 32 obtained using the same materials as in the first embodiment, a negative electrode sheet 34 and two separators 33, in such a manner that mix layer non-formation portions of the two electrode sheets 32, 34 overlap and jut out beyond one end and the other end, respectively, of the separators 33, in the longitudinal direction, whereupon the resulting wound body is squashed flat from the side-face direction, to yield thereby a flat shape that conforms to the shape of the container 21.

A positive electrode terminal 24 and a negative electrode terminal 26 for external connection are electrically connected to the electrode sheets 32, 34. In an appropriate way of connecting the terminals, the portions of the positive electrode mix layer non-formation portions of the electrode sheets 32, 34 that jut beyond the separators 33 may be gathered together in the radial direction of the wound electrode assembly 30, such that the positive electrode terminal 24 and the negative electrode terminal 26 are connected (for instance, welded) at those gathering portions. The electrode assembly 30, with the terminals 24, 26 connected thereto, is housed in the container 21, and an appropriate non-aqueous electrolyte solution (which may be identical to that of the first embodiment) is supplied into the container 21. Thereafter, the container 21 is sealed, to build thereby the lithium ion secondary battery 20 according to the present embodiment.

Third Embodiment

Figure 4:
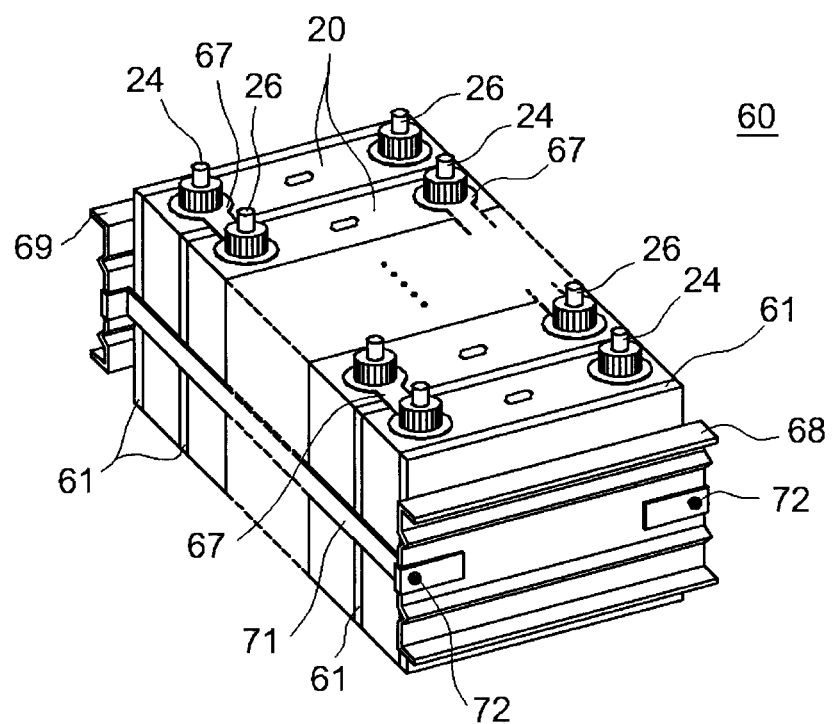
FIG. 4 is a partial cross-sectional diagram illustrating schematically the configuration of a battery pack according to an embodiment.

FIG. 4 illustrates the schematic configuration of a battery pack according to the present embodiment. The battery pack 60 is built using a plurality of batteries 20 (typically, 10 or more, preferably, about 10 to 30, for instance 20) according to the second embodiment. The batteries (single batteries) 20 are reversely arrayed one after the other, in such a manner that the positive electrode terminal 24 and the negative electrode terminal 26 of each battery are disposed alternately, in a direction along which the wide faces of the containers 21 (i.e. faces corresponding to the flat face of the wound electrode assembly 30 that is housed in the container 21) oppose each other. Cooling plates 61 of predetermined shape are disposed on both out-sides in the single battery arrangement direction (stacking direction), between the single batteries 20 thus arranged, in a state where cooling plates 61 are in close contact with the wide faces of the containers 21. The cooling plates 61 function as a heat dissipating member for causing the heat generated in each single battery, during use of the battery, to be dissipated efficiently. The cooling plates 61 have a shape that allows a cooling fluid (typically, air) to get between the single batteries 20 (for instance, a shape such that a plurality of parallel grooves that extend perpendicularly from one side of each rectangular cooling plate 61 up to the opposite side of the cooling plate are provided on the surface of the latter). Preferably, the cooling plates 61 are made of a metal having good thermal conductivity, or of lightweight and hard polypropylene, or of some other synthetic resin.

A pair of end plates 68, 69 is disposed further outward of the cooling plates 61 on both out-sides of the cooling plates 61 and the single batteries 20 arranged as described above (hereafter, the foregoing are also referred collectively as "single battery group"). The overall body (hereafter, also "bound body") that includes the end plates 68, 69 and the single battery group in which the single batteries 20 are arranged in the stacking direction as described above, is bound, with a prescribed binding pressure P, by binding bands 71 for fastening that are mounted so as to bridge the two end plates 68, 69, in the stacking direction of the bound body (i.e. transversal direction with respect to the axis of the wound electrode assembly 30). More specifically, the ends of the binding bands 71 are fastened and fixed to the end plate 68 by way of screws 72, so as to apply a prescribed binding pressure P in the above-described stacking direction (for instance, a binding pressure P of about 0.1 MPa to 10 MPa in the form of surface pressure exerted on the wide face of the container 21), to bind thereby the bound body. The positive electrode terminals 24 and the negative electrode terminals 26 between adjacent single batteries 20 are electrically connected to each other by way of connectors 67. A battery pack 60 of a desired voltage can be built thus by connecting the single batteries 20 in series.

Examples of the present invention are explained next, but the present invention is in not meant to be limited to or by those specific examples in any way.

Experimental Example 1

Synthesis of Positive Electrode Active Material Samples (Sample 1)

A mixed solution of nickel sulfate, cobalt sulfate and manganese sulfate in water was prepared, and then a NiCoMn complex hydroxide represented by $Ni_{0.33}Co_{0.34}Mn_{0.33}(OH)_2$ was co-precipitated (co-precipitation method) out of the resulting solution. The above complex hydroxide was mixed with $Li_2CO_3$ as a lithium source, to a molar ratio of $Li:Ni_{0.33}Co_{0.34}Mn_{0.33}(OH)_2$ of 1.15:1. The resulting mixture was fired at 700° C. to 1050° C. in the atmosphere, to yield a positive electrode active material represented by $Li_{1.15}Ni_{0.33}Co_{0.34}Mn_{0.33}O_2$.

(Sample 2)

$Li_2CO_3$, the above NiCoMn complex hydroxide and $WO_3$ as a W source were mixed to a molar ratio of Li:(Ni+Co+Mn+W) of 1.15:1, and a molar ratio of (Ni+Co+Mn+W):W of 1:0.005. The mixture was fired in the same way as in Sample 1. A positive electrode active material was obtained thus, in the form of a composition in which W was added to $Li_{1.15}Ni_{0.33}Co_{0.34}Mn_{0.33}O_2$, wherein the W content (addition amount) with respect to the total metal amount, excluding Li, (i.e. total amount of Ni, Co, Mn and W), was 0.5 mol %.

(Sample 3)

$Li_2CO_3$, the above NiCoMn complex hydroxide, $WO_3$ and $Nb_2O_3$ were mixed to a molar ratio of Li:(Ni+Co+Mn+W+Nb) of 1.15:1, and a molar ratio of (Ni+Co+Mn+W+Nb):W:Nb of 1:0.005:0.005. The resulting mixture was fired in the same way as in Sample 1, to yield a positive electrode active material being a composition where W and Nb were added to $Li_{1.15}Ni_{0.33}Co_{0.34}Mn_{0.33}O_2$ and wherein the addition amount of W and Nb was 0.5 mol % each, with respect to the total metal amount excluding Li.

(Sample 4)

$Li_2CO_3$, the above NiCoMn complex hydroxide, $WO_3$, $Nb_2O_3$ and $ZrO_2$ were mixed to a molar ratio of Li:(Ni+Co+Mn+W+Nb+Zr) of 1.15:1, and a molar ratio of (Ni+Co+Mn+W+Nb+Zr):W:Nb:Zr of 1:0.005:0.005:0.005. The resulting mixture was fired in the same way as in Sample 1, to yield a positive electrode active material being a composition where W, Nb and Zr were added to $Li_{1.15}Ni_{0.33}Co_{0.34}Mn_{0.33}O_2$ and wherein the addition amount of W, Nb and Zr was 0.5 mol % each, with respect to the total metal amount excluding Li.

(Sample 5)

$Li_2CO_3$, the above NiCoMn complex hydroxide, $WO_3$, and $ZrO_2$ were mixed to a molar ratio of Li:(Ni+Co+Mn+W+Zr) of 1.15:1, and a molar ratio of (Ni+Co+Mn+W+Zr):W:Zr of 1:0.005:0.005. The resulting mixture was fired in the same way as in Sample 1, to yield a positive electrode active material being a composition where W and Zr were added to $Li_{1.15}Ni_{0.33}Co_{0.34}Mn_{0.33}O_2$ and wherein the addition amount of W and Zr was 0.5 mol % each, with respect to the total metal amount excluding Li.

Construction of a Lithium Ion Secondary Battery

Each positive electrode active material sample obtained as described above, acetylene black as a conductive material, and PVDF were mixed with NMP, to a weight ratio of the foregoing materials of 89:8:3 and a solids concentration (NV) of about 40 wt %, to prepare thereby a positive electrode mix composition corresponding to each positive electrode active material sample.

Each positive electrode mix composition was applied onto both faces of a 15 μm-thick elongated aluminum foil (collector) and was dried, to form thereby positive electrode mix layers. The coating amount (solids basis) of the composition was adjusted so as to yield a total of about 12.8 mg/cm² for both faces. Next, the collector and the positive electrode mix layers on both faces thereof were pressed to a total combined thickness of 74 μm. Sheet-like positive electrodes (positive electrode sheets) corresponding to each positive electrode active material sample were thus prepared.

Natural graphite, SBR and CMC were mixed with deionized water to a weight ratio of the foregoing materials of 98:1:1 and NV of 45 wt %, to prepare an aqueous active material composition (negative electrode mix composition).

The composition was applied onto both faces of an about 15 µm-thick elongated copper foil (negative electrode collector) and was dried, to form thereby negative electrode mix layers. A sheet-like negative electrode (negative electrode sheet) was produced thus as described above.

Each positive electrode sheet and the negative electrode sheet thus produced were stacked together with two elongated separators (porous polyethylene sheets were used herein). The stacked sheets were wound in the longitudinal direction, to produce a wound electrode assembly. The electrode assembly was stuffed, together with a non-aqueous electrolyte solution, into an outer case, to build thereby an 18650-type lithium ion secondary battery. As the non-aqueous electrolyte solution there was used a solution having a composition wherein $LiPF_6$ was dissolved, to a concentration of 1 mol/L, in a mixed solvent comprising EC, DMC and EMC at a 3:3:4 volume ratio.

Measurement of Initial Reactive Resistance (25° C.)

The lithium ion secondary batteries built as described above were subjected to an appropriate conditioning treatment (for instance, an initial charge-discharge process that involved repeating, two to three times, a charging operation of constant-current charging for 3 hours at a charge rate of 1/10C, with further charging at constant current, at a 1/3C charge rate, up to 4.1 V, and an operation of constant-current discharging, at a discharge rate of 1/3C, down to 3.0 V). Thereafter, an AC impedance measurement was carried out at a measurement temperature of 25° C., a measurement frequency range from 0.001 to 10000 Hz, and amplitude of 5 mV. DC resistance Rsol and reactive resistance Rct (initial reactive resistance) were worked out through equivalent-circuit fitting in a Cole-Cole plot.

Capacity Retention Measurement

The conditioned batteries were charged at constant voltage, at a temperature of 25° C., under constant current of 1C (herein, 1 A), to a voltage between terminals of 4.1 V. The batteries were charged next at constant voltage until the total charge time reached 2 hours. The batteries after the above-described CC-CV charging were kept at 25° C. for 24 hours, after which the batteries were discharged at 25° C., at 1C constant current, from 4.1 V to 3.0 V, then at constant voltage until the total discharge time reached 2 hours, and the discharge capacity (initial capacity) at that time was measured. Next, there were repeated 1000 cycles of an operation of charging at 2C constant current, from 3.0 V to 4.1 V, alternated with an operation of discharging from 4.1 V to 3.0 V at 2C constant current, at 60° C. (high-temperature charge-discharge cycles). After the above-described charge-discharge cycles, the batteries were discharged at 1C constant current from 4.1 V to 3.0 V, at 25° C., and then the batteries were discharged at constant voltage until the total discharge time reached 2 hours, whereupon the discharge capacity (capacity after cycling) at that time was measured. The capacity retention (%) upon the above-described 1000 charge-discharge cycles was worked out on the basis of the following formula: {(capacity after cycling)/(initial capacity)}×100.

The capacity retention (%) in high-temperature charge-discharge cycling was worked out in accordance with the same procedure as described above, but herein the number of cycles was 2000.

Calculation of Reactive Resistance Ratio (25° C.)

An AC impedance measurement was performed at 25° C., under the same conditions as above, on the batteries having been subjected to the above-described 1000 and 2000 charge-discharge cycles. DC resistance Rsol and reactive resistance Rct (reactive resistance after cycling) were worked out through equivalent-circuit fitting in a Cole-Cole plot. The reactive resistance increase rate was obtained by dividing the value of reactive resistance after cycling by the initial reactive resistance value.

Figure 5:
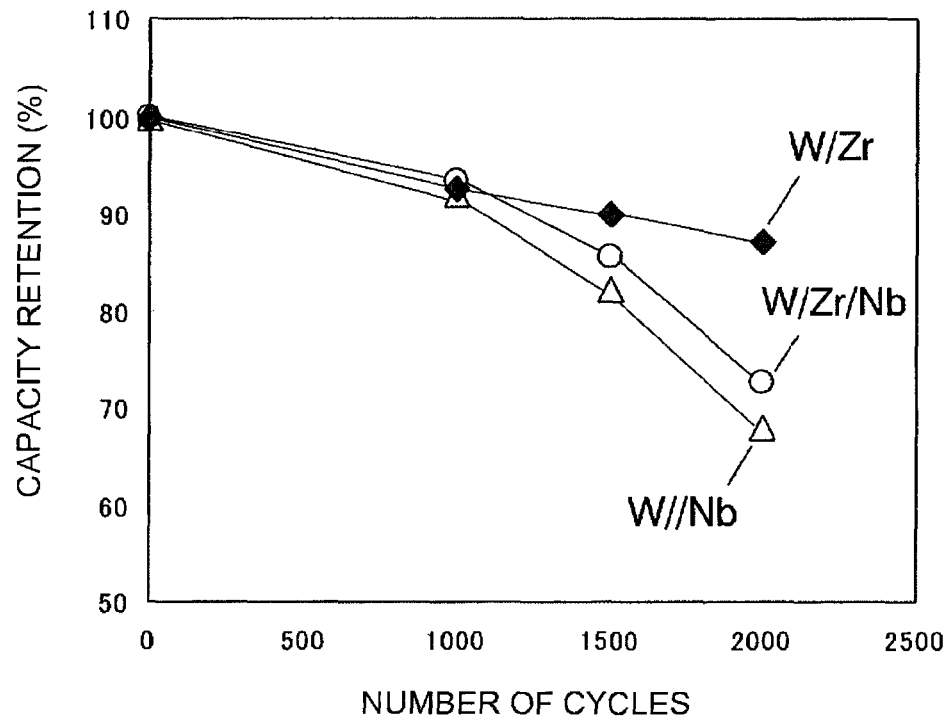
FIG. 5 is a graph illustrating the relationship between number of cycles and reactive resistance increase rate (25° C.)
Figure 6:
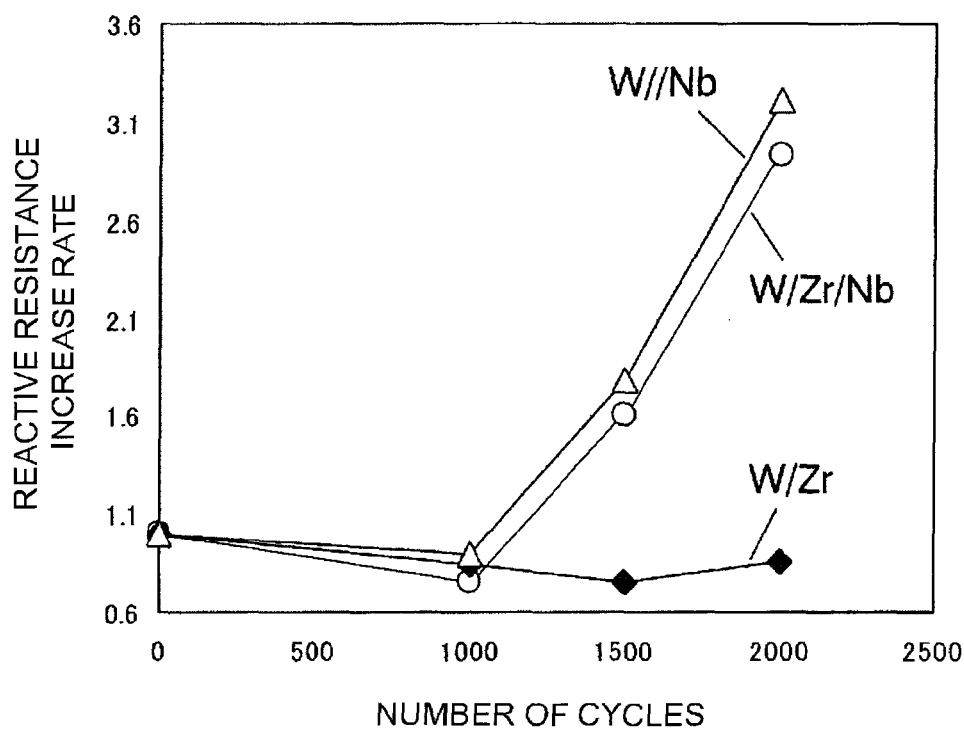
FIG. 6 is a graph illustrating the relationship between number of cycles and capacity retention (25° C.)

The results are given in Table 1 and illustrated in FIG. 5 and FIG. 6.

TABLE 1

| Sample | Addition amount (mol %) | | | Initial reactive resistance (25° c.) (mΩ) | Reactive resistance increase rate (25° C.) | | Capacity retention (25° C.) (%) | |
| --- | --- | --- | --- | --- | --- | --- | --- | --- |
| | W | Nb | Zr | | After 1000 cycles | After 2000 cycles | After 1000 cycles | After 2000 cycles |
| 1 | — | — | — | 2.00 | 1.20 | 3.95 | 94.0 | 66.5 |
| 2 | 0.50 | — | — | 1.70 | 0.95 | 1.25 | 92.5 | 86.3 |
| 3 | 0.50 | 0.50 | — | 1.40 | 0.90 | 3.21 | 92.0 | 67.8 |
| 4 | 0.50 | 0.50 | 0.50 | 1.00 | 0.75 | 2.93 | 93.5 | 72.6 |
| 5 | 0.50 | — | 0.50 | 1.20 | 0.85 | 0.86 | 92.5 | 87.2 |

As the figures and table show, the cells in Samples 3 and 4, where Nb was also added, besides W, exhibited a lower initial reactive resistance than the cells in Sample 2, which used a positive electrode active material having only W added thereto. The cells in Samples 3 and 4, exhibited a smaller increase in reactive resistance than in Sample 2, in the cycle test up to 1000 cycles. When the cycle test was performed to a greater number of cycles, however, the cells of Samples 3 and 4, in which Nb was used, exhibited abrupt deterioration (anomalous deterioration) once 1000 cycles were exceeded. Specifically, the reactive resistance of the cells of Samples 3 and 4 exhibited dramatic deterioration vis-à-vis Sample 2, in that reactive resistance after 2000 cycles increased to about three times, or more, of the initial value. As regards capacity retention, no marked difference was observed between Sample 2 and Samples 3 and 4 up to 1000 cycles. Upon more cycles, however, the capacity retention of Samples 3 and 4 dropped significantly as compared with that of Sample 2. This showed that a positive electrode active material having Nb added thereto, besides W, resulted in significantly impaired long-term durability in a battery provided with such an active material, as compared with a case in which only W was added.

In Sample 5, where Zr was added besides W, and no Nb was added, the increase in reactive resistance was kept low, even after 2000 cycles. Sample 5 afforded thus a yet lower reactive resistance increase rate than Sample 2. In Sample 5, the reactive resistance increase rate after 1000 cycles and after 2000 cycles were about the same. Sample 5 exhibited thus very good stability of the reactive resistance value versus multiple charge-discharge cycles. The capacity retention after 2000 cycles in Sample 5 was significantly greater than in Samples 3 and 4, and better than in Sample 2.

The gas generation amount of the batteries of Samples 3, 4 and 5 was measured in accordance with the method set forth in paragraph [0071] of Patent document 1. No significant differences were observed between the battery of Sample 5 and the batteries of Samples 3 and 4. That is, it was found that the positive electrode active material comprising W and Zr did not suffer from the problem of gas generation, also in a composition where Nb was excluded.

(Sample 6)

A positive electrode active material was obtained in the form of a composition wherein W and Zr were added to $Li_{1.15}Ni_{0.33}Co_{0.34}Mn_{0.33}O_2$ in such a manner that the addition amounts of W and Zr were 0.5 mol % each, with respect to the total metal amount excluding Li, in accordance with the same procedure as Sample 5, but herein the purity of the starting materials and the substance of the sagger used during firing were different from those of Sample 5. The Na, Ca and Mg contents in Sample 5 and Sample 6 were measured by ICP spectroscopy. The contents were as given in Table 2.

A lithium ion secondary battery similar to those of Samples 1 to 5 was built using the positive electrode active material of sample 6 obtained as described above, and the initial reactive resistance, reactive resistance ratio and the capacity retention of the battery were worked out. The results are given in Table 2 together with the evaluation results for Sample 5.

TABLE 2

| | Content (ppm) | | | Initial reactive resistance (25° C.) (mΩ) | Reactive resistance increase rate (25° C.) | | Capacity retention (25° C.) (%) | |
|---|---|---|---|---|---|---|---|---|
| Sample | Na | Ca | Mg | | After 1000 cycles | After 2000 cycles | After 1000 cycles | After 2000 cycles |
| 5 | 250 | 40 | 60 | 1.20 | 0.85 | 0.86 | 92.5 | 87.2 |
| 6 | 480 | 890 | 800 | 1.30 | 0.80 | 0.84 | 93.2 | 87.9 |

A comparison between Samples 5 and 6 revealed that battery performance was not adversely affected but rather, that the charge-discharge cycle characteristics tended to improve, as a result of an increase in the content of the metals in the table, at least for a content of Na no greater than 500 ppm, of Ca no greater than 1000 ppm and of Mg no greater than 1000 ppm. More specifically, Sample 6 afforded a lower reactive resistance increase rate, and higher capacity retention, than Sample 5, both after 1000 cycles and after 2000 cycles.

Experimental Example 2

Synthesis of a Positive Electrode Active Material Sample (Sample 7)

$Li_2CO_3$, the above-described NiCoMn complex hydroxide, and $Nb_2O_3$ as a Nb source were mixed to a molar ratio of Li:(Ni+Co+Mn+Nb) of 1.15:1, and a molar ratio of (Ni+Co+Mn+Nb):Nb of 1:0.005. The resulting mixture was fired in the same way as in Sample 1. A positive electrode active material was thus obtained having a composition where Nb was added to $Li_{1.15}Ni_{0.33}CO_{0.34}Mn_{0.33}O_2$, such that the addition amount of Nb was 0.5 mol % with respect to the total metal amount excluding Li.

(Sample 8)

$Li_2CO_3$, the above-described NiCoMn complex hydroxide, and $ZrO_2$ as a Zr source were mixed to a molar ratio of Li:(Ni+Co+Mn+Zr) of 1.15:1, and a molar ratio of (Ni+Co+Mn+Zr):Zr of 1:0.005. The resulting mixture was fired in the same way as in Sample 1. A positive electrode active material was thus obtained having a composition where Zr was added to $Li_{1.15}Ni_{0.33}Co_{0.34}Mn_{0.33}O_2$, such that the addition amount of Zr was 0.5 mol % with respect to the total metal amount excluding Li.

(Sample 9)

$Li_2CO_3$, the above-described NiCoMn complex hydroxide, and $MoO_3$ as a Mo source were mixed to a molar ratio of Li:(Ni+Co+Mn+Mo) of 1.15:1, and a molar ratio of (Ni+Co+Mn+Mo):Mo of 1:0.005. The resulting mixture was fired in the same way as in Sample 1. A positive electrode active material was thus obtained having a composition where Mo was added to $Li_{1.15}Ni_{0.33}CO_{0.34}Mn_{0.33}O_2$, such that the addition amount of Mo was 0.5 mol % with respect to the total metal amount excluding Li.

(Sample 10)

$Li_2CO_3$, the above-described NiCoMn complex hydroxide, and $Ta_2O_5$ as a Ta source were mixed to a molar ratio of Li:(Ni+Co+Mn+Ta) of 1.15:1, and a molar ratio of (Ni+Co+Mn+Ta):Ta of 1:0.005. The resulting mixture was fired in the same way as in Sample 1. A positive electrode active material was thus obtained having a composition where Ta was added to $Li_{1.15}Ni_{0.33}Co_{0.34}Mn_{0.33}O_2$, such that the addition amount of Ta was 0.5 mol % with respect to the total metal amount excluding Li.

Construction and Evaluation of Lithium Ion Secondary Batteries

Lithium ion secondary batteries were built, in the same way as above, using the positive electrode active material samples 7 to 10, and the initial reactive resistance, the reactive resistance increase rate and the capacity retention of the batteries were worked out. The results are given in Table 3. Table 3 sets out results together with the evaluation results for Sample 2.

TABLE 3

| Sample | Added element (0.5 mol %) | Initial reactive resistance (25° C.) (mΩ) | Reactive resistance increase rate (25° C.) | | Capacity retention (25° C.) (%) | |
|---|---|---|---|---|---|---|
| | | | After 1000 cycles | After 2000 cycles | After 1000 cycles | After 2000 cycles |
| 2 | W | 1.70 | 0.95 | 1.25 | 92.5 | 86.3 |
| 7 | Nb | 1.80 | 0.80 | 3.65 | 92.0 | 67.2 |
| 8 | Zr | 1.90 | 0.65 | 1.38 | 93.0 | 85.4 |
| 9 | Mo | 1.75 | 2.70 | — | 85.0 | — |
| 10 | Ta | 2.00 | — | — | — | — |

As Table 3 shows, the battery of Sample 7, to which Nb alone was added, exhibited a reducing effect on initial reactive resistance that was lower than that elicited through addition of W alone (Sample 2). Under the above-described conditions for high-temperature charge-discharge, the battery of Sample 7 exhibited a reactive resistance increase rate that was lower than that of Sample 2, and exhibited also high capacity retention, matching that of Sample 2, up to 1000 cycles. Beyond 1000 cycles (refer to results after 2000 cycles), however, the battery of Sample 7 exhibited a dramatic rise in reactive resistance increase rate, and a marked drop in capacity retention. By contrast, the battery of Sample 8, where Zr alone was added, exhibited excellent durability both in terms of reactive resistance increase rate and capacity retention.

The completely dissimilar durability in the batteries depending on the presence of W, Nb and Zr, and combinations of the foregoing, and in particular, the marked loss of durability caused by the presence of Nb, became apparent only upon multiple charges and discharges under harsh conditions, such as those of the above-described high-temperature charge-discharge cycles.

Experimental Example 3

Synthesis of a Positive Electrode Active Material Sample (Samples 11 to 20)

In the production of Sample 5 the amount of $WO_3$ and $ZrO_2$ used was modified in such a manner that the W and Zr addition amounts (mol %) with respect to the total metal amount, excluding Li, took the values given Table 4. Otherwise, positive electrode active material samples 11 to 20 having a composition where W and Zr were added to $Li_{1.15}Ni_{0.33}Co_{0.34}Mn_{0.33}O_2$ were obtained in the same way as in Sample 5.

Construction and Evaluation of Lithium Ion Secondary Batteries

Lithium ion secondary batteries were built as described above, using the positive electrode active material samples 11 to 20 produced as described above, and using the positive electrode active material samples 1, 2, 5, 7 produced in Experimental examples 1 and 2. The initial reactive resistance at low temperature (−30° C.) of the batteries and the capacity retention and reactive resistance increase rate of the batteries against 2000 cycles of high-temperature charge-discharge cycling were worked out.

Figure 7:
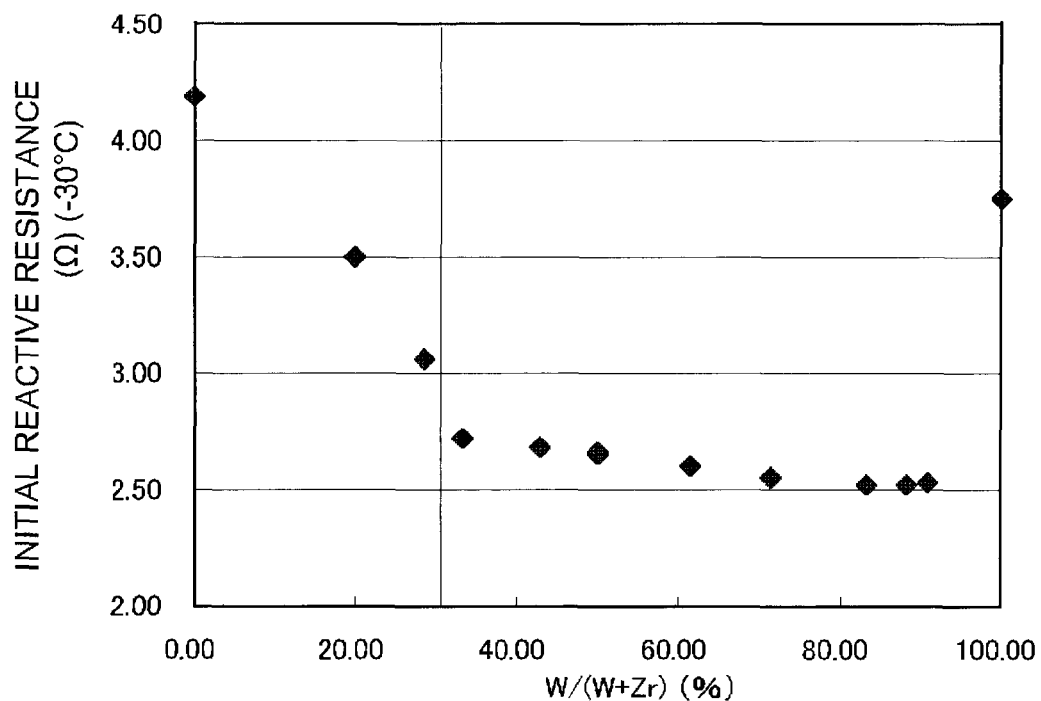
FIG. 7 is a graph illustrating the relationship between the proportion of W in a total number of added moles of W and Zr and initial reactive resistance (−30° C.)

Low-temperature initial reactive resistance was determined in the same way as in the above-described initial reactive resistance (25° C.) measurement, except that herein the measurement temperature during the AC impedance measurement was −30° C. Low-temperature capacity retention was determined in the same way as in the above-described capacity retention measurement, except that herein the measurement temperature for initial capacity and capacity after cycling was −30° C. Low-temperature reactive resistance ratio was determined in the same way as in the above-described calculation of the reactive resistance ratio (25° C.), except that herein the measurement temperature during the AC impedance measurement was −30° C. The obtained results are given Table 4, together with the proportion of the addition amount of W (W addition amount ratio (%)) in the total addition amount of W and Zr and together with the total addition amount of W and Zr (mol %). The relationship between addition amount ratio and initial reactive resistance is illustrated in FIG. 7.

TABLE 4

| Sample | Addition amount (mol %) W | Addition amount (mol %) Zr | Addition amount ratio W/(W+Zr) (%) | Total addition amount W+Zr (mol %) | Initial reactive resistance (−30° C.) (Ω) | Reactive resistance increase rate (−30° C.) | Capacity retention (%) |
|---|---|---|---|---|---|---|---|
| 1 | 0.00 | 0.00 | — | 0.00 | 4.41 | 4.25 | 66.50 |
| 2 | 0.50 | 0.00 | 100.00 | 0.50 | 3.75 | 1.16 | 86.30 |
| 5 | 0.50 | 0.50 | 50.00 | 1.00 | 2.65 | 0.87 | 87.20 |
| 7 | 0.00 | 0.50 | 0.00 | 0.50 | 4.19 | 1.23 | 85.40 |
| 11 | 0.05 | 0.20 | 20.00 | 0.25 | 3.50 | 1.08 | 86.80 |
| 12 | 0.20 | 0.50 | 28.57 | 0.70 | 3.06 | 0.97 | 87.00 |
| 13 | 0.05 | 0.10 | 33.33 | 0.15 | 2.72 | 0.99 | 86.90 |
| 14 | 0.60 | 0.80 | 42.86 | 1.40 | 2.68 | 0.86 | 87.30 |
| 15 | 0.10 | 0.10 | 50.00 | 0.20 | 2.66 | 0.92 | 86.90 |
| 16 | 0.80 | 0.50 | 61.54 | 1.30 | 2.60 | 0.84 | 87.30 |
| 17 | 0.50 | 0.20 | 71.43 | 0.70 | 2.55 | 0.96 | 87.10 |
| 18 | 0.50 | 0.10 | 83.33 | 0.60 | 2.52 | 0.98 | 87.20 |
| 19 | 1.50 | 0.20 | 88.24 | 1.70 | 2.52 | 0.84 | 87.30 |
| 20 | 2.00 | 0.20 | 90.91 | 2.20 | 2.53 | 0.93 | 87.10 |

As the figures and table show, Samples 5 and 11 to 20, which comprised both elements W and Zr, exhibited a lower initial reactive resistance than Sample 1, in which neither W nor Zr were added, than Sample 2, in which W alone was added, and than Sample 7, in which Zr alone was added, and exhibited likewise excellent durability also in 2000-cycle high-temperature charge and discharge. As illustrated in FIG. 7, particularly good results (3Ω or less) of initial reactive resistance were obtained when W/(W+Zr) ranged from 30% to less than 100%.

The above embodiments of the present invention explained in detail above are merely illustrative in nature. The features set forth in the claims encompass various modifications and changes to the specific examples illustrated above.

The technology disclosed in the present specification encompasses the following features:

(1) A positive electrode active material for lithium secondary batteries (typically, lithium ion secondary batteries), wherein W and Zr are added to a nickel-containing lithium complex oxide having a layered structure, and the material contains no Nb.

(2) A positive electrode active material production method being a method for producing the positive electrode active material of (1), comprising:

a step of deciding the use amount of a W source and a Zr source so as to satisfy the following condition: (a) the proportion of the number of moles of W in the total number of moles of W and Zr ranges from 30% to less than 100%; and a step of synthesizing a nickel-containing lithium complex oxide that satisfies condition (a) above, using a W source and a Zr source in the decided amounts.

INDUSTRIAL APPLICABILITY

Figure 8:
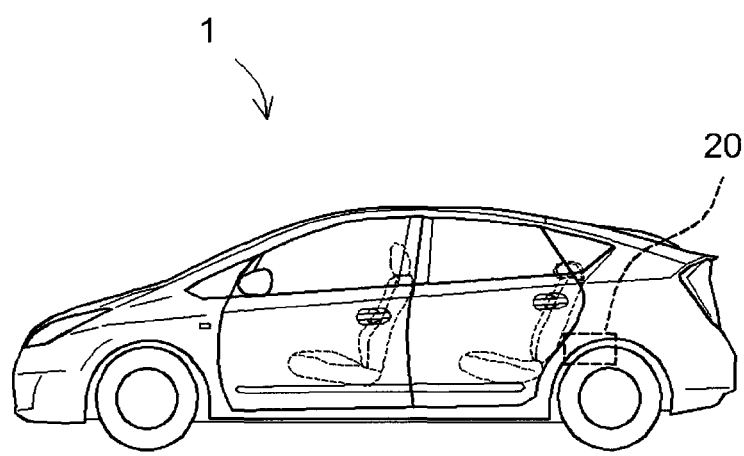
FIG. 8 is a side-view diagram illustrating schematically a vehicle (automobile) provided with a lithium secondary battery.

The lithium secondary battery (typically, a lithium ion secondary battery) provided according to the technology disclosed herein delivers excellent performance (for instance, low reactive resistance, high durability), as described above, and hence the battery can be used as a lithium secondary battery for various applications. For instance, the battery is suitable as a power supply for a motor (electric motor) that is installed in a vehicle such as an automobile. Such a lithium ion secondary battery may be used in the form of the battery pack 60 in which a plurality of the lithium ion secondary batteries is connected in series and/or in parallel, as illustrated, for instance, in FIG. 4. Therefore, the technology disclosed herein allows providing a vehicle (typically, an automobile, in particular, an automobile equipped with an electric motor, such as a hybrid automobile, an electric automobile or a fuel cell automobile) 1, that is provided with such a lithium ion secondary battery (which may be in the form of a battery pack) 20, as a power supply, as illustrated schematically in FIG. 8.

The invention claimed is:

1. A lithium secondary battery, comprising:
a positive electrode having a positive electrode active material;
a negative electrode having a negative electrode active material; and
a non-aqueous electrolyte,
wherein the positive electrode active material is a nickel-containing lithium complex oxide having a layered structure and contains no Nb,
the nickel-containing lithium complex oxide is represented by Formula (II):

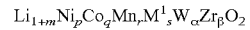

$$Li_{1+m}Ni_pCo_qMn_rM^1_sW_\alpha Zr_\beta O_2 \quad (II)$$

where M¹ in Formula (II) is at least one selected from among Al, Cr, Fe, V, Mg, Ti, Mo, Cu, Zn, Ga, In, Sn, La, Ce, Ca and Na; α, β, m, p, q, r and s in Formula (II) are numerals that satisfy $0<\alpha$, $0<\beta$, $0.3 \le \alpha/(\alpha+\beta)<1$, $0 \le m \le 0.2$, $0<p \le 0.6$, $0<q \le 0.5$, $0<r \le 0.5$, $0 \le s \le 0.02$, $p+q+r+s=1$.

2. The lithium secondary battery according to claim 1, wherein M¹ in Formula (II) substantially consists of at least one selected from among Mg, Ca and Na.

3. The lithium secondary battery according to claim 1, wherein M¹ in Formula (II) includes Na, and
a content of Na in the nickel-containing lithium complex oxide is 500 ppm or less.

4. The lithium secondary battery according to claim 1, wherein M¹ in Formula (II) includes Na, Ca and Mg, and
a content of Na, a content of Ca and a content of Mg in the nickel-containing lithium complex oxide are 500 ppm or less, 50 ppm to 1500 ppm and 100 ppm to 1500 ppm, respectively.

5. The lithium secondary battery according to claim 1, wherein an amount of W is 0.01 mol % to 3 mol % with respect to the total metal amount (T) in the nickel-containing lithium complex oxide, wherein T excludes the amount of lithium.

6. The lithium secondary battery according to claim 5, wherein an amount of Zr is 0.01 mol % to 2 mol % with respect to the total metal amount (T) in the nickel-containing lithium complex oxide, wherein T excludes the amount of lithium.

7. The lithium secondary battery according to claim 6, wherein the sum of the amounts of W and Zr is 0.02 mol % to 5 mol % with respect to the total metal amount (T) in the nickel-containing lithium complex oxide, wherein T excludes the amount of lithium.

8. The lithium secondary battery according to claim 7, wherein the nickel-containing lithium complex oxide contains substantially no metal element other than Li, Ni, Co, Mn, W, Zr, Mg, Ca and Na, and
a content of Na, a content of Ca and a content of Mg in the nickel-containing lithium complex oxide are 500 ppm or less, 50 ppm to 1500 ppm and 100 ppm to 1500 ppm, respectively.

9. The lithium secondary battery according to claim 8, wherein Ni, Co and Mn contents are approximately identical, on a number of atoms basis.

10. The lithium secondary battery according to claim 1, wherein Ni, Co and Mn contents are approximately identical, on a number of atoms basis.

11. A vehicle comprising the lithium secondary battery according to claim 1.

12. A lithium secondary battery, comprising:
a positive electrode having a positive electrode active material;
a negative electrode having a negative electrode active material; and
a non-aqueous electrolyte,
wherein the positive electrode active material is a nickel-containing lithium complex oxide having a layered structure,
the nickel-containing lithium complex oxide is represented by Formula (II):

$$Li_{1+m}Ni_pCo_qMn_rM^1_sW_\alpha Zr_\beta O_2 \quad \text{(II)}$$

where M¹ in Formula (II) is at least one selected from among Al, Cr, Fe, V, Mg, Ti, Mo, Cu, Zn, Ga, In, Sn, La, Ce, Ca and Na; α, β, m, p, q, r and s in Formula (II) are numerals that satisfy $0<\alpha$, $0<\beta$, $0.3 \le \alpha/(\alpha+\beta)<1$, $0 \le m \le 0.2$, $0<p \le 0.6$, $0<q \le 0.5$, $0<r \le 0.5$, $0 \le s \le 0.02$, $p+q+r+s=1$,
M¹ in Formula (II) includes Na, and
a content of Na in the nickel-containing lithium complex oxide is 500 ppm or less.

13. The lithium secondary battery according to claim 12, wherein M¹ in Formula (II) further comprises Ca and Mg, and
contents of Ca and Mg in the nickel-containing lithium complex oxide are 50 ppm to 1500 ppm and 100 ppm to 1500 ppm, respectively.

14. The lithium secondary battery according to claim 13, wherein contents of Na, Ca and Mg in the nickel-containing lithium complex oxide are 300 ppm to 500 ppm, 50 ppm to 1000 ppm and 100 ppm to 1000 ppm, respectively.

15. The lithium secondary battery according to claim 12, wherein the nickel-containing lithium complex oxide contains substantially no Al.

16. The lithium secondary battery according to claim 15, wherein α and β in Formula (II) satisfy $0.3 \le \alpha/(\alpha+\beta)<1$.

17. The lithium secondary battery according to claim 12, wherein α, β, m, p, q, r and s in Formula (II) satisfy $0.0001 \le \alpha/(p+q+r+s+\alpha+\beta) \le 0.03$, $0.0001 \le \beta/(p+q\alpha r+s\alpha\alpha+\beta) \le 0.02$ and $0.0002 \le (\alpha+\beta)/(p+q+r+s+\alpha+\beta) \le 0.05$.

18. The lithium secondary battery according to claim 12, wherein Ni, Co and Mn contents are approximately identical, on a number of atoms basis.

19. A lithium secondary battery, comprising:
a positive electrode having a positive electrode active material;
a negative electrode having a negative electrode active material; and
a non-aqueous electrolyte,
wherein the positive electrode active material is a nickel-containing lithium complex oxide having a layered structure,
the nickel-containing lithium complex oxide is represented by Formula (II):

$$Li_{1+m}Ni_pCo_qMn_rM^1_sW_\alpha Zr_\beta O_2 \quad \text{(II)}$$

where M¹ in Formula (II) is at least one selected from among Al, Cr, Fe, V, Mg, Ti, Mo, Cu, Zn, Ga, In, Sn, La, Ce, Ca and Na; α, β, m, p, q, r and s in Formula (II) are numerals that satisfy $0<\alpha$, $0<\beta$, $0.3 \le \alpha/(\alpha+\beta)<1$, $0 \le m \le 0.2$, $0<p \le 0.6$, $0<q \le 0.5$, $0<r \le 0.5$, $0 \le s \le 0.02$, $p+q+r+s=1$.

20. The lithium secondary battery according to claim 19, wherein the nickel-containing lithium complex oxide contains substantially no Al.

21. The lithium secondary battery according to claim 19, wherein the nickel-containing lithium complex oxide contains substantially no metal element other than Li, Ni, Co, Mn, W, Zr, Mg, Ca and Na.

* * * * *